Nov. 24, 1959 R. A. PAETZ ET AL 2,913,936
METHOD AND APPARATUS FOR FORMING TURBINE BLADES
Filed July 21, 1955 4 Sheets-Sheet 4

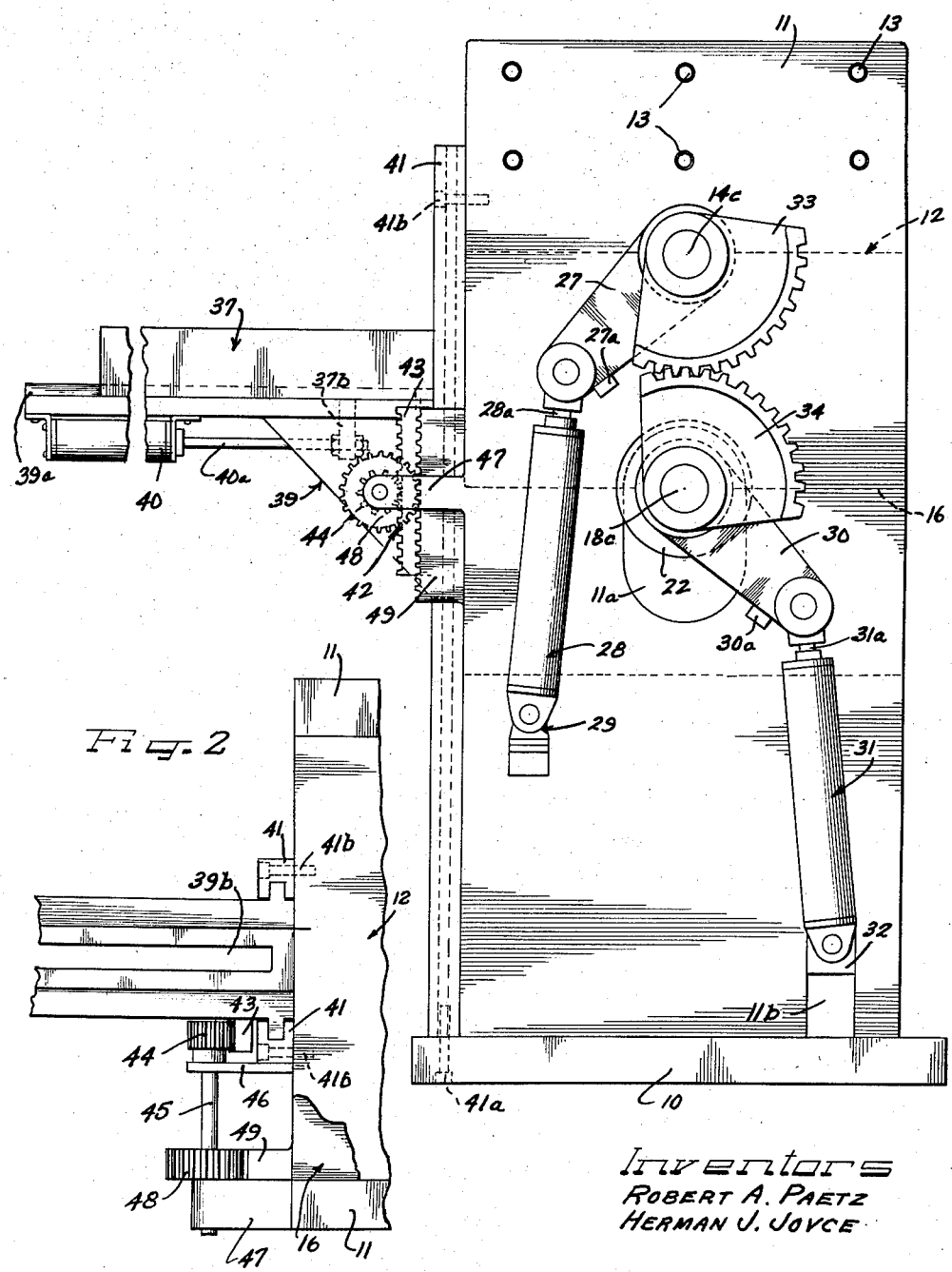

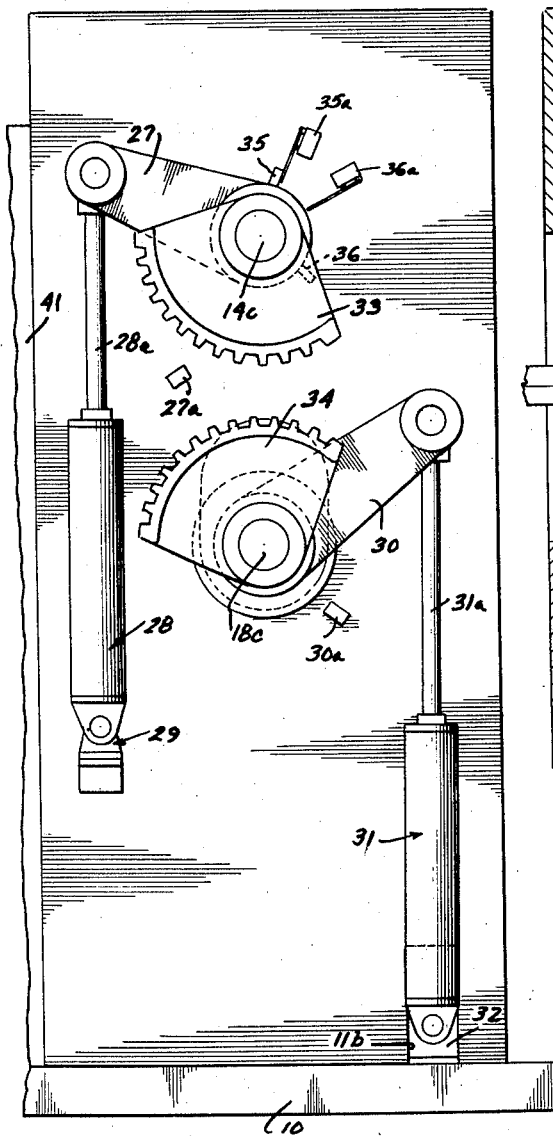
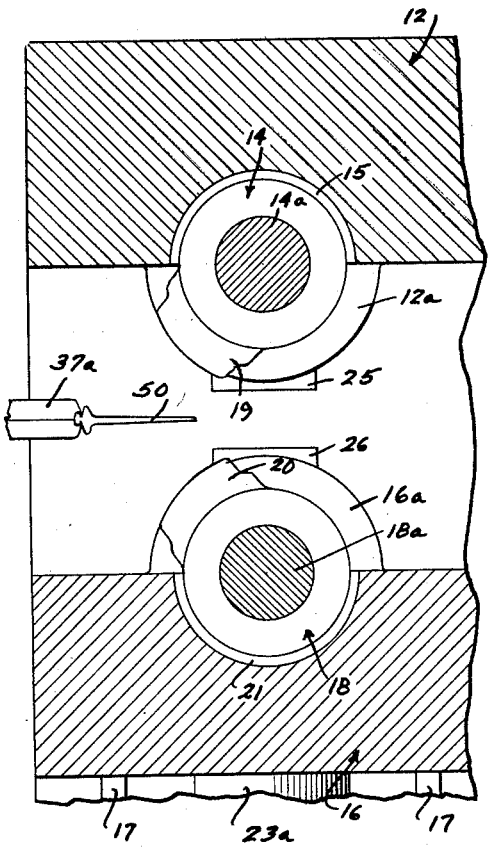
Fig-4
Fig-5
Inventors
ROBERT A. PAETZ
HERMAN J. JOYCE

Inventors
ROBERT A. PAETZ
HERMAN J. JOYCE
by Hill, Sherman, Meroni, Gross & Simpson Attys.

United States Patent Office 2,913,936
Patented Nov. 24, 1959

2,913,936

METHOD AND APPARATUS FOR FORMING TURBINE BLADES

Robert A. Paetz, Chagrin Falls, and Herman J. Joyce, South Euclid, Ohio, assignors to Thompson Ramo Wooldridge, Inc., a corporation of Ohio Application July 21, 1955, Serial No. 523,533

10 Claims. (Cl. 80—25)

This invention relates to a method and apparatus for fashioning workpieces to a desired shape and configuration, within specified dimensional tolerances, and more particularly to a method and apparatus for manufacturing metallic blades.

More specifically, the invention provides a forming machine primarily for the manufacture of turbine and compressor blades for use in turbine engines or the like, although other uses and purposes may be apparent to those skilled in the art.

The machine of the present invention receives metal blades of tough and strong alloys which are initially formed or extruded to rough airfoil section, and subsequently shapes these blades to a final desired airfoil section having a precisely dimensioned predetermined cross section, shape, and pitch. However, it is understood that the rolling machine of this invention may fashion a blade of final form and size from a metallic blank or billet not having an initially formed airfoil section.

According to the invention, a forming machine is provided which comprises a frame having an upper stationary section, a lower movable section, rollers journaled in each section having forming dies mounted thereon, hydraulic means for effecting movement between the frame sections and pre-stressing the machine, a work carriage for supporting a blade blank and feeding the blank to the forming dies, a drive means for synchronously operating the die carrying rollers, and means for automatically pre-stressing the machine to a predetermined forming pressure at the beginning of the working cycle and for releasing the forming pressure at the end of the working cycle.

In the forming of relatively thin edge articles, such as the leading and trailing edges of turbine or compressor blades, as herein contemplated, interference may occur after a blade is rolled and while the blade is being retracted with the dies for the next rolling operation. In the instant invention, this interference condition has been eliminated by separating the dies during the return or non-work stroke of the machine.

In the present invention, at the beginning of the work stroke, the work carriage feeds a chucked blade blank between the opposed forming dies. Initially, upon pre-stressing of the machine, the leading edges of the die bite the blade blank near the root thereof to form a root fillet radius between the root and the vane of the blade. During this biting operation, the work carriage is held stationary; thus, a flat forging operation forms the root fillet radius of the blade. The vane or airfoil is then formed by a roll forging operation, wherein the work carriage holds the blade in line as the die carrying rollers pivot together. The work carriage is preferably driven in such a manner as to exert a back pressure or tension pull on the blade. Thus, a flat forge operation and a roll forge operation is performed on the blade blank.

It is therefore an object of this invention to provide a method and apparatus for forming workpieces to a desired shape and configuration.

Another object of this invention is to provide a rolling machine capable of producing a blade having desired airfoil dimensions and a grain flow pattern which will materially strengthen the blade.

Still another object of this invention resides in the provision of a rolling machine of such rigid construction that it greatly resists deflections set up in the machine by internal rolling pressures, enables a workpiece, such as a blade, to be rolled with a minimum number of passes economically, thereby reducing stress concentration at the thin edges of the blade, and produces blades which are less work hardened and more uniform.

A further feature of this invention is to provide a blade rolling machine having hydraulic means for pre-stressing or loading the machine prior to the formation of any workpiece.

A still further object of the invention is to provide a blade rolling machine having hydraulic means which makes possible the absolute control of roll pressures, thereby prolonging the tool life.

A further feature of the invention is to provide a rolling machine having die-carrying rollers capable of changing the center to center distance and permitting a greater center to center distance on the return or non-working stroke of the oscillating rollers, thereby preventing any danger of clashing the dies together on this non-working stroke.

Another object of this invention resides in the provision of a blade rolling machine having die-carrying rollers capable of changing the center to center distance of the rollers under hydraulic pressure which permits vertical die-forming or flat forging of a workpiece with the roller stationary. After this vertical movement or closure of the roll has been effected, the workpiece may be further formed by rotary movement of the rollers, thereby effecting a roll forging operation. Thus, the machine of the instant invention may combine flat forging and roll forging of a workpiece.

Still another object of this invention is to provide a rolling machine for fabricating thin metallic blades, wherein automatic means are provided for exerting hydraulic pressure on the forming dies at the beginning of the work stroke and releasing the pressure at the termination of the work stroke.

Another object of this invention resides in the provision of a blade forming machine having a pair of co-acting forming dies mounted on pivotal rollers and means for pre-stressing the machine, wherein the forming dies are capable of flat forging the root fillet radius of a blade and roll forging the airfoil or vane.

Still another object of this invention is to provide a forming machine for fabricating thin metallic blades, wherein the machine is pre-stressed during the forming operation and the pre-stressed load may be varied within predetermined limits.

A still further object of this invention is to provide a blade forming machine having a pair of co-acting die carrying rollers and an adjustable mounted work carrier for delivering a workpiece to the die carrying rollers and holding the workpiece in position during the forgoing operations, wherein one of the rollers is movable relative to the other roller and means is provided in association with the movable rollers to adjustably position the work carriage to maintain the longitudinal axis of the blade blank equally spaced between the die-carrying rollers.

Other objects, features, and advantages of the invention will be apparent from the following detailed description of the drawings, which, by way of a preferred example only illustrates the invention.

On the drawings:

Figure 1 is a side elevational view of a forming machine constructed and in accordance with the invention;

Figure 2 is a fragmentary top plan view of the forming machine in Fig. 1 illustrating the manner in which the work carriage support is mounted on the machine;

Figure 4 is a fragmentary elevational view similar to Figure 1, but illustrating certain parts in position at the end of the work stroke subsequent to the lowering of the movable roller when the forming machine is in an un-stressed condition;

Figure 5 is a fragmentary side elevational view, partly schematic, illustrating the position of the work carriage holding a blade blank, and the die carrying rollers at the end of the work stroke when the forming machine is in an un-stressed condition;

As shown on the drawings:

Figure 3:
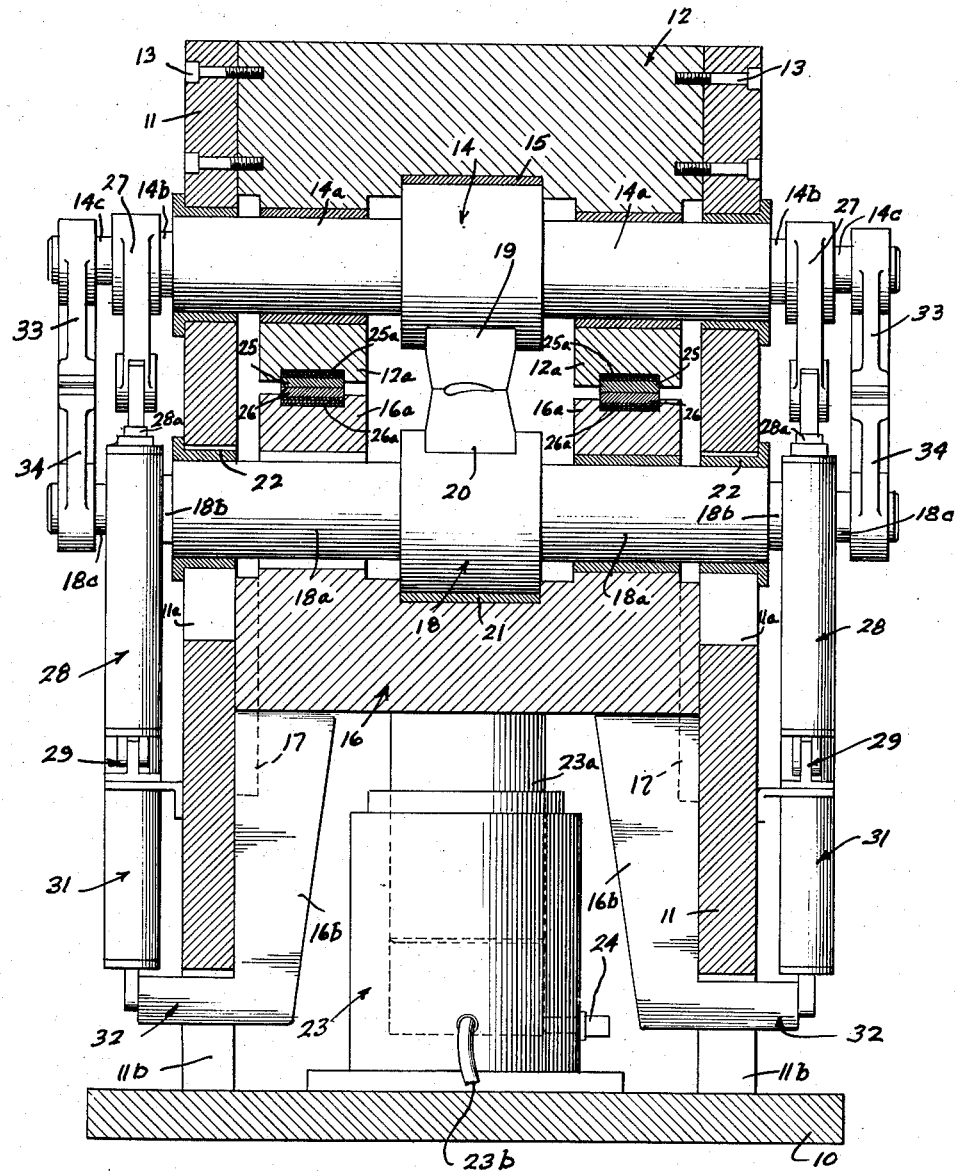
Figure 3 is a vertical cross sectional view, with parts in elevation, of the forming machine shown in Figure 1, taken substantially through the center of the machine.

Referring generally to Figures 1 and 3, the forming machine of the present invention includes generally a frame having a base plate 10 for resting on a supporting surface in horizontal position, a pair of upstanding and parallel spaced supporting members 11, 11 resting on the base plate 10 and being secured thereto.

Extending between the supporting members 11 adjacent the upper end thereof is a crosshead 12. The crosshead 12 is suitably secured to the supporting members, such as by a plurality of stud bolts 13.

The crosshead 12 is provided with a pair of downwardly extending and parallel spaced legs 12a, which are provided with aligned bearing members for journaling stub shafts 14a, 14a extending axially from opposite ends of a roller 14. The stub shafts 14a, 14a also project through openings in opposite supporting members 11 to be additionally supported by bearings therein. A semi-cylindrical backup bearing 15 is held by the crosshead 12 for engaging a segmental portion of the roller 14 to resist deflection thereof during the forming operation. In effect, the crosshead 12 takes the form of a U-shaped crosshead.

Positioned in underlying relationship with respect to the upper stationary crosshead 12 is a lower movable crosshead 16. The movable crosshead 16 is slidably received between the supporting members 11 by means of vertical guideways 17, 17 of any suitable type, such as a conventional dove-tail shaped guide. The crosshead 16 carries upstanding and parallel spaced legs 16a, 16a which are in substantial alignment with the legs 12a of the upper crosshead 12.

A roller 18 having axially extending stub shafts 18a, 18a is suitably carried in journal relationship by aligned bearings of the leg 16a. The rollers 14 and 18 are vertically aligned and provided with coacting forming dies 19 and 20, respectively, which as shown in Figure 3 have cavities for forming an airfoil on a blade. However, it is to be understood that other types of forming dies may be used with the present invention. A semi-cylindrical backup bearing 21 similar to the bearing 15 is carried by the movable crosshead 16 to engage a segmental portion of the roller 18 for resisting deflection thereof during the forming operation.

The stub shafts 18a of the movable roller 18 extend through vertical slots 11a, 11a of the opposite sides of the supporting members 11, and are provided at their outer ends with flanged guide bushings 22, 22 for aiding in the guiding of the vertical movement of the roller 18.

The hydraulic ram 23 is provided for vertically moving the movable crosshead 16 and corresponding roller 18, and for pre-stressing the machine during the forming operation and releasing the load of the machine during the non-working operation thereof. The ram 23 is solidly supported on the base plate 10 between the upstanding supporting members 11 and is provided with a piston rod 23a which is rigidly secured to the other side of the movable crosshead 16. The piston rod 23a doubles as a piston for the ram. The hydraulic ram 23 is loaded and unloaded by hydraulic fluid through a hydraulic line indicated by the numeral 23b. An adjustable pressure relief valve 24 is provided which communicates with the pressure chamber of the hydraulic ram 23 and will be actuated when the load on the forming machine exceeds a predetermined safety limit.

Hardened steel contact plates 25 and 26 are mounted at the free ends of each crosshead leg 12a and 16a, respectively, and are adapted to provide in contacting relationship a precise pre-load surface and precise roller center to center distance during the forming operation. And any number of shims may be inserted between the steel plates and the corresponding crosshead leg, as indicated by the numerals 25a and 26a, to accurately adjust the pre-load surface and roller center to center distance.

The rollers 14 and 18 are driven by conventional fluid motors. As seen in Figure 3, a pair of reduced shaft portions 14b, 14b axially extend outwardly from the stub shafts 14a of the roller 14 beyond the corresponding supporting members 11. A pair of crank arms 27, 27 are locked to the reduced shaft portions 14b at one end, and are each pivotally connected to the free end of the piston rod 28a of a fluid motor 28. The casing of each fluid motor 28 is pivotally secured at one end to a bracket extending laterally from the upstanding supporting members 11, as indicated by the numerals 29, 29.

The movable roller 18 likewise carries axially extending shaft portions 18b, 18b from the free ends of stub end shafts 18a. A pair of similar crank arms 30 (only one shown in Fig. 1) is similarly locked to the shaft portions 18b as crank arms 27 are locked to the shaft portions 14b. The free ends of the crank arms 30 are pivotally secured to the free ends of piston rods 31a of a pair of fluid motors 31, 31. Each casing of the fluid motors 31 is pivotally secured at one end to a laterally extending arm 32. Each arm 32 is suitably carried by a pair of depending members 16b, 16b of the movable crossheads 16. In other words, the fluid motors 31 are pivotally connected to the movable crosshead 16. Vertical slots 11b, 11b are provided in the supports 11 for freely receiving the arms 32 to permit their vertical movement with the crosshead 16.

To provide synchronous pivotal movement of the rollers 14 and 18 during the forming operation, a pair of coacting segmental gears 33 and 34 are suitably secured to a second reduced shaft portion 14c and 18c, respectively, axially extending from each reduced shaft portion 14b and 18b, respectively, of the rollers 14 and 18.

Because the movable roller 18 moves away from the stationary roller 14 during the non-working operation of the machine, the coacting gears will be unmeshed and relatively spaced apart as seen in Figure 4. To assure the proper meshing of the gears upon the beginning of the forming stroke and when the forming machine is pre-stressed, a pair of crank arm stops 27a and 30a are respectively provided for each crank 27 and 30 at a predetermined position, so that when the crank arms abut against the respective stops, the coacting gears 33 and 34 will properly mesh upon movement of the lower roller 18 toward the upper roller 14. The stops 27a and 30a are, of course, suitably secured to the upstanding supporting members 11.

Automatic release of the pressure in the hydraulic ram 23 which effects lowering of the movable roller 18 and unstressing of the forming machine at the end of the forming operation or work stroke, and automatic prestressing of the forming machine at the beginning of the forming operation or work stroke is accomplished by an electrical switch system which is more or less diagrammatically illustrated in Figure 4. A pair of actuating detents 35 and 36 are angularly mounted on one of the crank arms 27 in such a way as to actuate corresponding switch members 35a and 36a on the adjacent supporting member 11. Actuation of switch 35a by detent 35 causes unloading of the hydraulic ram pressure and un-stressing of the forming machine, while actuation of the switch 36a by the detent 36 causes the forming machine to be pre-stressed prior to the work stroke. While not shown, it is to be understood that a suitable solenoid operated hydraulic valve or other suitable means may be associated with the switches 35a and 36a, and the hydraulic ram 23 to effect the desired operations.

Absolute control of roller pressure is made possible by the hydraulic ram 23, and this hydraulic action greatly enhances the effective die life. Since optimum roller pressure may be set by the adjustable relief valve 24 for any alloy or condition under which the machine may be desired to operate, any abnormal pressure cannot be created as the pressure applied is controlled hydraulically.

A work carriage, generally indicated by the numeral 37, is provided to feed workpieces such as blade blanks 38 to the forming dies of the forming machine and to hold the blades in proper position during the work performing operation of the pressurized forming dies. The work carriage 37 is provided with a conventional workpiece clamping mechanism or chuck 37a for gripping the blade blank 38. The jaws of the chuck 37a may directly grip the root of the blade blank, or as shown in the instant case, a chuck grip may be provided on the root of the blade blank, as indicated by the numeral 38a in Figures 8 and 9. Of course, the chuck grip 38a will be removed by any suitable method after the blade blank 38 has been properly formed.

Now referring to Figures 1 and 2, it is seen that the work carriage 37 is slidably mounted to reciprocate along a suitable guideway 39a of a mounting platform 39. The guideway 39a in this case is shown to be a conventional dove-tail arrangement.

A fluid motor 40 is provided to reciprocably drive the work carriage 37 along the mounting platform 39. The fluid motor 40 is suitably secured to the underside of the platform 39, and carries a piston rod 40a. A lug 37b extends downwardly from the carriage 37 through a longitudinal slot 39b of the forming platform 39 to be adjustably secured to the free end of the piston rod 40a. Thus, it is seen that the forming machine of the present invention is completely hydraulically driven.

Inasmuch as it is well known that the conventional hydraulic fluid is highly inflammable, the hydraulic fluid utilized in the present invention shall consist generally of water mixed with a chemical additive to impart corrosion resistance, bacterial control, and lubrication properties necessary for non-hazardous operation.

The mounting platform 39 is mounted on the frame of the forming machine for vertical movement therewith to adjust the center line of the chucked blade 38 equally between the center to center roller distance. A pair of spaced vertical guide bars 41, 41 is provided for mounting the platform 39. Each bar is secured at its lower end to the base plate 10 by suitable means such as fasteners 41a, and is secured at its upper end to the crosshead 12 by suitable means such as fasteners 41b.

A position adjusting mechanism, generally indicated by the numeral 42, controls the movement of the work carriage 37 by the movement of the lower movable roller 18. This mechanism includes a vertically positioned rack gear 43 fastened to one side of the carriage platform 39. A small pinion gear 44 meshes with the rack gear 43, and is suitably locked to a shaft 45. The shaft 45 is suitably journaled in a pair of spaced brackets 46 and 47. The bracket 46 is fastened to the adjacent guide bar 41, while the bracket 47 is fastened to the adjacent supporting member 11. A larger pinion gear 48 is suitably locked to the shaft 45 and in meshing engagement with a rack gear 49 fastened to the lower movable crosshead 16. The pinion gear 48 is provided with twice the number of teeth than the pinion gear 44.

Thus, it will be seen that movement of the lower crosshead 16 a certain distance effects movement of the carriage platform 39 through the positioning adjuster 42 of one-half that certain distance. In other words, the mounting platform 49 moves at half the speed of the movable crosshead 16. Hence, the center line of a chucked blade will always be equally spaced between the roller center to center distance.

Figure 6:
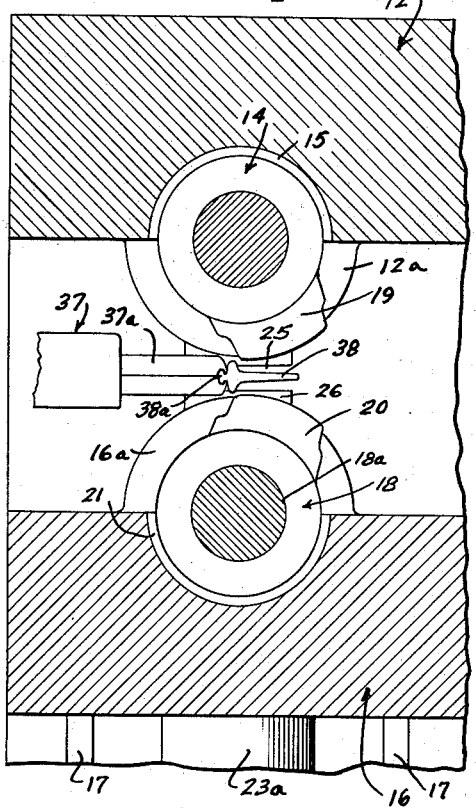
Figure 6 is a fragmentary elevational view, with parts in section, illustrating the position of the rollers and work carriage prior to the pre-stressing of the forming machine at the beginning of the forming operation.
Figure 7:
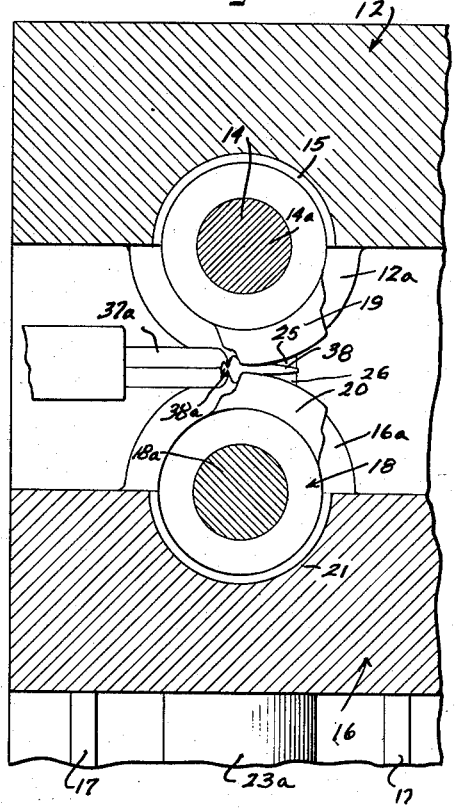
Figure 7 is a view similar to Figure 6, for illustrating the die carrying rollers in biting position in respect to the blade blank, wherein the forming machine is pre-stressed.

In operation, a blade blank is chucked on the work carriage 37 and advanced to the first forging position as shown in Figure 6. When the rollers reach this position, the detent 36 on the crank arm 27 will actuate switch 36a to cause pressurized fluid to be fed to the hydraulic ram 23 for pre-stressing the forming machine.

The carriage 37 holds the blade blank 38 in position so that the leading edges of the forming dies 19 and 20 bite the blade blank between the root and vane to form by flat forging the fillet or platform.

After the fillet has been formed, the fluid motors 28 and 31 will be energized to begin the pivotal movement of the die carrying rollers 14 and 18 for performing the roll forging operation on the airfoil or vane of the blade blank 38.

It will be understood that a common hydraulic system will be connected to the fluid motors 28 and 31 to effect substantial simultaneous energization thereof. It is noted that during the flat forging operation, the coacting gears 33 and 34 are positioned in meshing relationship to provide during the roll forging operation synchronous movement of the die carrying rollers 14 and 18.

At the end of the forming operation or work stroke, the detent 35 on the crank arm 27 engages a switch 35a to release the pressure on the hydraulic ram 23 and to allow the roll center to center distance to be increased. As the movable crosshead 16 moves downwardly, the carriage mounting platform 39 will likewise move downwardly to take the blade away from the upper forming die 19. During the roll forging operation, the fluid motor 40 which reciprocates the work carriage 37 may be so adjusted and operated as to provide a back pressure or a tension pull on the blade blank 38.

Should additional forming be necessary on a blade blank after a single forming operation has been completed, the blade may be run through another cycle. Depending upon the fluid pressure delivered to the hydraulic ram 23, varying stresses may be applied by the forming dies 19 and 20. For example, the prestressed load may vary from 300 to 1200 tons. And, the forming machine may be cycled to perform one or more passes on a single blade blank at the same pre-stressed load or at an increased pre-stressed load.

Figure 8:
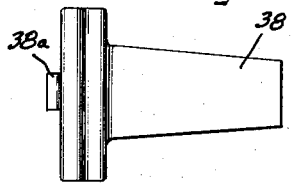
Figure 8 is a plan view of a blade blank prior to the forming operation.
Figure 10:
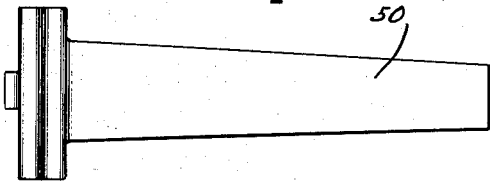
Figure 10 is a plan view of a blade in its completed form after being formed by the forming machine of the present invention.
Figure 9:
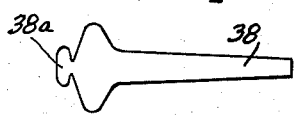
Figure 9 is a side elevational view of the blade blank of Figure 8.
Figure 11:
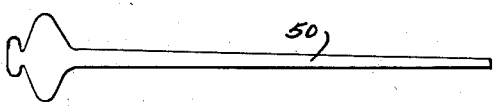
Figure 11 is an elevational view of the blade shown in Figure 10.

A blade blank will appear approximately as shown in Figures 8 and 9 and indicated by the numeral 38, while a finished blade blank will appear substantially as shown in Figures 10 and 11 indicated by the numeral 50.

The ability of the forming machine, in accordance with the present invention, to change rollers center to center distance under hydraulic pressure permits forming or flat forging of a part with the roller stationary. After the flat forging operation and the closure of the rollers have taken place, the same part may be formed or roll forged by the rotary movement of the rollers. In this manner, a forming machine combines flat forging and roll forging of a workpiece.

Inasmuch as a rolling machine of the present invention is so completely rigid on the forming or working stroke, it can accomplish more accurate working operations and exert higher pressure loads.

In view of the foregoing, it is understood that the blade forming machine of the instant invention is of such rigid construction that it greatly resists deflections set up in the machine by internal rolling pressures, enables a blade workpiece to be rolled with a minimum number of passes, thereby reducing the stress concentration at the thin edges of the blade and producing a blade that is less work hardened and more uniform, and is capable of performing work under a pre-stress load and releasing the load during the non-working operation of the machine.

It will be understood that modifications and variations may be effected without departing from the scope of the novel concepts of the present invention, but it is understood that this application is to be limited only by the scope of the appended claims.

We claim as our invention:

1. A blade rolling machine comprising a pair of upstanding parallel spaced frame members, a stationary crosshead extending between said members adjacent the top thereof, a movable crosshead disposed between said frame members in underlying relationship to said stationary crosshead, means on said frame members for guiding said movable crosshead along a vertical path, a hydraulic ram associated with said movable crosshead for controlling the position of the movable crosshead by actuation of said ram and pre-stressing the machine through the movable and stationary crossheads, a die-carrying roller journaled in each member, means for pivoting the rollers in opposite directions, backup bearings carried by said crossheads for the corresponding rollers, a blade carrying work carriage reciprocably guided to discose a blade blank between the dies, drive means actuated by fluid motors for performing the working stroke by pivoting the rollers and reciprocating the work carriage, means for synchronizing the pivotal movement of the rollers on the work stroke and means actuated by said rollers for controlling valves associated with the hydraulic ram, the actuation of said valves effecting pressure within said ram, whereby the machine is automatically non-stressed after the work stroke of the carriage by releasing the pressure in said ram and pre-stressed prior to the working stroke thereof by increasing the pressure in said ram.

2. A blade forming machine comprising an upstanding frame, a crosshead secured to said frame, a second crosshead slidably received from said frame, a roller journaled in each crosshead, a forming die carried by each roller and adapted to work in coacting relationship, means for urging said slidable crosshead into working position relative to the stationary crosshead and for pre-stressing the machine, means for synchronously driving said rollers, a work carriage for holding a blank blade during the forming operation, and means connecting with the second crosshead for adjustably mounting said carriage, whereby said last-named means upon movement of said crosshead controls the position of the carriage to substantially align the longitudinal center line of the blade blank equally between the forming dies.

3. A blade forming machine comprising a frame including a base plate adapted to rest on a horizontal surface and a pair of parallel spaced upstanding members secured to said base plate, a crosshead extending between said members adjacent the top thereof and rigidly secured thereto, a movable crosshead slidably received by said upstanding members to be guided along a vertical path and in underlying relationship with respect to the stationary crosshead, said crossheads being in superimposed alignment, a roller journaled in each crosshead, coacting forming dies mounted on each roller, a hydraulic ram positioned between the base plate and said movable crosshead to pre-stress the machine during the forming operation, hydraulic motors for driving the rollers, segmental gears connected to each roller adapted to be in meshing relationship during the forming operation to synchronize the pivotal die carrying rollers, a work carriage reciprocable along a horizontal plane for holding a blade blank in association with the die carrying rollers during the forming operation thereof, vertical guide bars secured to said stationary crosshead and the base plate for slidably mounting said work carriage along a vertical plane and a gear train arrangement associated with said frame and movable crosshead to adjust the vertical position of said carriage and maintain the blade blank equally positioned between the forming dies.

4. A rolling machine adapted for the manufacture of a blade for use in turbines and compressors in turbine engines, comprising a base plate and an upstanding frame secured to said base plate, a supporting crosshead member secured to said frame, a movable supporting crosshead member guidably received by said frame, a plurality of rollers carried by said crosshead members, forming dies carried by said rollers and oscillatable in coacting relation with the rollers to exert forming pressure against a workpiece placed between the dies, a hydraulic ram for moving said movable crosshead member into working position relative to said stationary crosshead member and for pre-stressing the machine, a work carriage reciprocable in a horizontal plane for positioning the workpiece between said dies, means for movably mounting said work carriage along a vertical plane, and gear means mounted by said last-named means, the movable crosshead and work carriage to adjust the vertical position of said carriage and maintain the longitudinal center line of the workpiece equally between the forming dies.

5. A machine for fashioning a workpiece comprising a base member, a vertical frame, a stationary crosshead and a movable crosshead mounted in said frame member, a roller oscillatably mounted on each of said crossheads and each carrying a coacting forming die, hydraulic means associated with said movable crosshead positioned to control the forming pressure and pre-stress the machine, a reciprocable carriage for feeding a workpiece to said dies, means associated with said movable crosshead to adjust the vertical position of said carriage and maintain the longitudinal center line of the workpiece equally between said dies, said last-named means including gear means connecting with the carriage and movable crosshead whereby the carriage moves at half the speed of said crosshead to maintain the center line of the blade equally spaced between the roller center to center distance and a drive means for synchronously driving said rollers and carriage.

6. A rolling machine for fashioning a workpiece which comprises a vertical frame having a stationary crosshead and a movable crosshead, a roller oscillatably supported in each of said crossheads and each carrying a forming die thereon, the movable roller supporting crosshead being hydraulically actuated to control the forming pressure and pre-stress the machine, a reciprocable carriage supported by said frame for feeding a workpiece to said dies, means for movably mounting said carriage along a vertical plane, means associated with said movable crosshead to adjust the vertical position of said carriage and maintain the longitudinal center line of the workpiece equally between the dies, said last-named means including gear means connecting with the carriage and movable crosshead whereby the carriage moves at approximately half the speed of said crosshead to maintain a center line of the blade equally spaced between the roller center to center distance, and a drive means for synchonously driving the rollers and carriage.

7. A machine for fashioning a workpiece comprising a base plate, a pair of upstanding frame members, a lower movable section and an upper stationary section supported between said frame members, a pivotal roller supported by each section and each having a forming die carried thereby, a hydraulic ram carried by said base plate associated with and for controlling the movement of the lower section to pre-stress the machine and provide a forming pressure for said dies, a reciprocable carriage supported by said frame for feeding a workpiece to said dies, means controlling said ram responsive to the pivotal die carrying rollers, and means secured to said movable section to automatically adjust the vertical position of said carriage along a vertical plane and substantially align the longitudinal center line of the workpiece equally between the forming dies, said last-named means including gear means connecting with the carriage and movable crosshead whereby the carriage speed is related to the crosshead speed to maintain the center line of the blade equally spaced between the roller center to center distance.

8. A blade rolling machine including a stationary upstanding frame, a stationary crosshead supported by said frame, a slidable crosshead guidingly received by said frame, a roller journalled in each crosshead, each roller having a coacting forming die mounted thereon, a reciprocable carriage for drawing a blade between said dies, means associated with said movable crosshead to adjust the vertical position of said carriage to align the carriage whereby the center line of the blade is equally positioned between the dies, said last-named means including gear means connecting with the carriage and movable crosshead to closely relate the speed of carriage movement to the speed of crosshead movement to maintain the center line of the blade equally spaced between the roller center to center distance, a guide for synchronously guiding the rollers and carriage, a fluid pressure operated mechanism for urging said slidable crosshead into working position relative to the stationary crosshead and for pre-stressing the machine, and means on said machine for automatically actuating said fluid mechanism to release the pressure upon said slidable crosshead and separate said dies.

9. A blade rolling machine comprising a base plate, a pair of spaced upstanding frame members, a stationary crosshead bridgedly supported between said members, a movable crosshead, both of said crossheads being generally aligned in superimposed relation, guide means on said frame members slidably receiving said movable crosshead, a roller journalled in each crosshead, forming dies carried by the rollers, a hydraulic ram associated with said movable crosshead to pre-stress the machine and to move the movable crosshead into working position relative to the stationary crosshead, means for automatically actuating said ram to lower said movable crosshead, a reciprocable carriage having a blade gripper thereon for drawing a blade between the dies, means associated with said movable crosshead to adjust the vertical position of said carriage to maintain the centerline of the blade equally between the dies, fluid power motors for synchronously driving said rollers and carriage and means associated with the movable crosshead and with vertical guide bars secured to said stationary crosshead and said base plate for slidably mounting said carriage along a vertical plane, said last-named means including gear means connecting with the carriage and movable crosshead whereby the carriage moves at substantially half the speed of the crosshead to maintain the center line of the blade equally spaced between the roller center to center distance.

10. A blade rolling machine comprising a frame including a base plate, a pair of spaced upstanding frame members secured to said base plate, a stationary crosshead bridgedly supported between said members, a movable crosshead, both of said crossheads being generally aligned in superimposed relation, guide means on said frame member slidably receiving said movable crosshead for vertical movement, a roller journalled in each crosshead, bearings supported by each crosshead backing up said rollers to minimize deflection thereof, a forming die carried by each of the rollers, a hydraulic ram associated with said movable crosshead to pre-stress the machine and provide the forming pressure for said dies, means for automatically actuating said ram to lower said movable crosshead, a reciprocable carriage having a blade gripper thereon for holding and drawing a blade blank between the dies, fluid power motors and gear means connecting therewith for synchronously driving said rollers and carriage, vertical guide bars secured to said stationary crosshead and said base plate for slidably mounting said carriage along a vertical plane, and a gear train arrangement associated with one of said guide bars, one of said frame members and the movable crosshead to adjust the vertical position of said carriage and maintain the center line of the blade blank equally positioned between the forward edges of the forming dies.

References Cited in the file of this patent

UNITED STATES PATENTS

| | | |
|---|---|---|
| 18,408 | Perkins | Oct. 13, 1857 |
| 371,778 | McDougall | Oct. 18, 1887 |
| 741,085 | Webb | Oct. 13, 1903 |
| 848,630 | Cameron | Apr. 2, 1907 |
| 984,345 | Biggert | Feb. 14, 1911 |
| 2,118,224 | Pearson | May 24, 1938 |
| 2,358,929 | Inslee | Sept. 26, 1944 |
| 2,654,277 | Hedlund | Oct. 6, 1953 |
| 2,691,907 | Friedman | Oct. 19, 1954 |
| 2,736,948 | Barnes | Mar. 6, 1956 |